United States Patent
Vollmer et al.

(10) Patent No.: US 7,977,826 B2
(45) Date of Patent: Jul. 12, 2011

(54) MULTIPOLE PERMANENT-MAGNET SYNCHRONOUS MACHINE HAVING TOOTH-WOUND COILS

(75) Inventors: Rolf Vollmer, Gersfeld (DE); Holger Schunk, Lendershausen (DE); Erich Bott, Hollstadt (DE); Matthias Braun, Weichtungen (DE)

(73) Assignee: Siemens Aktiengesellschaft, München (DE)

( * ) Notice: Subject to any disclaimer, the term of this patent is extended or adjusted under 35 U.S.C. 154(b) by 465 days.

(21) Appl. No.: 11/720,645

(22) PCT Filed: Nov. 28, 2005

(86) PCT No.: PCT/EP2005/056265
§ 371 (c)(1),
(2), (4) Date: Jun. 1, 2007

(87) PCT Pub. No.: WO2006/058871
PCT Pub. Date: Jun. 8, 2006

(65) Prior Publication Data
US 2009/0295251 A1    Dec. 3, 2009

(30) Foreign Application Priority Data
Dec. 1, 2004    (DE) .......................... 10 2004 058 046

(51) Int. Cl.
  *H02K 37/00* (2006.01)
  *H02K 37/10* (2006.01)
  *H02K 37/02* (2006.01)
  *H02K 3/48* (2006.01)
(52) U.S. Cl. .................. 310/49.01; 310/214; 310/254.1; 310/216.111; 310/67 R; 310/156.01

(58) Field of Classification Search .................. 310/254, 310/156.01, 162, 195, 216.111, 216.112, 310/156.45, 156.53, 67 R, 49.01–49.55
See application file for complete search history.

(56) References Cited

U.S. PATENT DOCUMENTS
4,294,304 A    10/1981    Delassus
4,874,975 A    10/1989    Hertrich
(Continued)

FOREIGN PATENT DOCUMENTS
DE    39 41 709 A1    6/1991
(Continued)

OTHER PUBLICATIONS

Friedrich, Jürgen K.H.: "Bauformen und Betriebsverhalten modularer Dauermagnetmaschinen" 1991, Fakultät Für Elektrotechnik, Universität Der Bundeswehr München, XP002387835; p. 16; Abs. 3,4; p. 24, Abs.3, Abb.2.3, 2.4, 2.5; p. 26, Abs.3; Sequenz 2.17.

*Primary Examiner* — Quyen Leung
*Assistant Examiner* — Terrance Kenerly
(74) *Attorney, Agent, or Firm* — Henry M. Feiereisen; Ursula B. Day

(57) ABSTRACT

The permanently excited synchronous machine (1) includes a rotor (3) and a stand (2) which contains a three-branched winding system (8) which comprises tooth coils. The stand (2) has a total of three or six grooves (5) and a tooth (6, 7) is formed there between. A total of three tooth coils (9) are arranged in the grooves (5) and each coil is associated with one of the three winding phases. The number of user pole pairs (pN) is four or five. The rotor (3) has twice as many user pole pairs (pN) of permanent magnets (18) which are evenly distributed on the periphery.

10 Claims, 3 Drawing Sheets

U.S. PATENT DOCUMENTS

| | | | |
|---|---|---|---|
| 5,099,165 A | 3/1992 | Ackermann | |
| RE35,763 E * | 4/1998 | Burgbacher | 310/51 |
| 5,744,893 A * | 4/1998 | Zhao et al. | 310/216.092 |
| 5,874,795 A * | 2/1999 | Sakamoto | 310/156.12 |
| 5,880,551 A * | 3/1999 | Prudham | 310/261.1 |
| 6,043,574 A * | 3/2000 | Prudham | 310/49.08 |
| 6,140,731 A * | 10/2000 | Torok et al. | 310/181 |
| 6,956,313 B2 * | 10/2005 | El-Gabry et al. | 310/179 |
| 2002/0063486 A1 | 5/2002 | Lee et al. | |
| 2002/0135243 A1* | 9/2002 | Kotani et al. | 310/49 R |
| 2002/0175587 A1 | 11/2002 | Vollmer | |
| 2003/0038557 A1* | 2/2003 | Strothmann | 310/181 |
| 2004/0145267 A1 | 7/2004 | Lowry et al. | |

FOREIGN PATENT DOCUMENTS

| | | |
|---|---|---|
| DE | 199 59 729 A1 | 7/2001 |
| DE | 199 61 760 A1 | 7/2001 |
| DE | 101 24 415 A1 | 11/2002 |
| FR | 28 23 612 A1 | 10/2002 |
| GB | 2 341 732 A | 3/2000 |
| JP | 5466411 * | 11/1977 |
| JP | 63-265560 | 11/1988 |
| JP | 4-008154 A | 1/1992 |
| JP | 04217885 * | 8/1992 |
| JP | 06-105488 A | 4/1994 |
| JP | 06-178473 A | 6/1994 |
| JP | 06-253518 A | 9/1994 |
| JP | 11-234988 | 6/1999 |
| JP | 11-234 988 | 8/1999 |
| JP | 2002-209346 A | 7/2002 |
| JP | 2002-291212 A | 10/2002 |
| JP | 2002-305851 A | 10/2002 |
| JP | 2003-009443 A | 1/2003 |
| JP | 2004-072899 | 3/2004 |
| JP | 2004-274963 A | 9/2004 |

* cited by examiner

MULTIPOLE PERMANENT-MAGNET SYNCHRONOUS MACHINE HAVING TOOTH-WOUND COILS

BACKGROUND OF THE INVENTION

The invention relates to a permanent-magnet synchronous machine having a rotor and having a stator, which contains a winding system having three winding phases and being constructed with tooth-wound coils.

Such a permanent-magnet synchronous machine is currently used in various embodiments. Examples are described in DE 199 61 760 A1 and in DE 101 24415A1. A current machine type involves a low coil number, for example three, always with a low useful pole pair number, for example of one. Such machines are operated with the basic pole pair number of the stator. Also known are so-called harmonic machines, in which a pole pair number of the rotor corresponds to an integral multiple of the basic pole pair number of the stator. Such multipole synchronous machines have, for example, a useful pole pair number of four, but a higher coil number is always also provided. Thus nine or twelve coils are conventional.

When designing these permanent-magnet synchronous machines, particular attention needs to be paid to an inexpensive implementation and as high a capacity as possible. The capacity is defined as the torque which can be achieved per unit volume. Further criteria which are likewise critical relate to the possibility of operation at a high voltage, i.e. in the region of a few 100 V, and a physical size which is as small as possible. Despite the many available variants, as yet no optimum embodiment is known which satisfies these requirements equally.

SUMMARY OF THE INVENTION

The object of the invention therefore consists in specifying a permanent-magnet synchronous machine of the type described at the outset which has a high capacity and can be produced in a cost-effective manner.

This object is achieved by a permanent-magnet synchronous machine according to the invention which includes a rotor and a stator, which contains a winding system having three winding phases and being constructed with tooth-wound coils, wherein a) the stator has in total three or six slots, between which in each case one tooth is formed, b) in total three tooth-wound coils are arranged in the slots, each of which tooth-wound coils being associated with one of the three winding phases, c) a useful pole pair number of four or five is provided, and d) the rotor is provided with double the useful pole pair number of permanent magnets distributed uniformly over the circumference.

Owing to the low coil number combined with a high useful pole pair number, the synchronous machine according to the invention represents a considerable deviation from the machine concepts conventional to date which always contain a combination of low coil number with low useful pole pair number or of high coil number with high useful pole pair number. Within the context of the invention, it has been recognized that, with the smallest possible coil number for a synchronous machine having three winding phases of three, a very high capacity, which is also markedly improved in comparison with the known embodiments, can be achieved if a multipole design with a useful pole pair number of four or five is provided. The slot number, which is likewise low owing to the low coil number, together with the use of tooth-wound coils, contributes to a simple and therefore inexpensive production of the machine according to the invention. In addition, the low slot number and the small winding heads resulting from the tooth-wound coils make a small overall physical size possible.

Preferably, the stator has in total six slots, and only turns of a single one of the three tooth-wound coils are arranged in each of the slots. A wound tooth alternates with an unwound tooth in the circumferential direction. These single-layer tooth-wound coils in each case surround one tooth and are physically separated from one another by an unwound tooth. This results, owing to the construction, in very effective electrical insulation of the tooth-wound coils with respect to one another, without special insulation means needing to be used for this purpose. In addition, this embodiment with the six slots has a particularly high capacity.

In a further variant, a tooth width of the wound teeth is dimensioned in accordance with $$0.75 \cdot b_M < b_Z < 1.25 \cdot b_M,$$

where $b_Z$ denotes the tooth width of the wound teeth, and $b_M$ denotes a magnet width of the permanent magnets. Then, particularly effective magnetic flux guidance results. The coupling of the magnetic field between the stator and the rotor is very efficient. In particular, the tooth width of the wound teeth is substantially equally as large as the magnet width of the permanent magnets.

Furthermore, the tooth-wound coils may be in the form of prefabricated former-wound coils. This considerably simplifies manufacture. This variant manages without the teeth being wound on the stator laminate stack, which may otherwise involve a complex and therefore cost-increasing threading technique. The use of former-wound coils also results in a very high copper fill factor based on the slot cross section, as a result of which the nonreactive coil resistance is reduced and the capacity increases.

Another embodiment is characterized by the fact that the tooth-wound coils each comprise a winding comprising a plurality of turns, and the respective windings are designed such that adjacent turns are at slightly differing electrical potentials than one another during operation. In particular, the potential difference between adjacent turns is only a fraction of the electrical potential present between the two incoming coil lines. Thus, primarily also the first turn, which is connected to one incoming line, is therefore arranged within the winding such that it is locally separated from the last turn, which is connected to the other incoming line. As a result, the outlay on electrical insulation for the electrical conductors used for producing the tooth-wound coils can be reduced and a higher proportion of copper can be introduced into the slots. Precise positioning of the individual turns can be achieved particularly effectively by means of former-wound coils being prefabricated.

Preferably, the slots each have a side which faces the rotor and is designed to be open, with the result that the tooth-wound coils, which are in particular in the form of prefabricated former-wound coils, can be inserted easily. Also, the open slots bring about an advantageous inductance behavior with regard to sensorless operation.

Furthermore, it is advantageous if the slots have in each case two side walls, which extend away from the rotor and are arranged parallel to one another. In comparison with radially running side walls, the parallel embodiment is better suited for the use of prefabricated former-wound coils and also makes a higher copper fill factor possible.

In order to secure the tooth-wound coils in the slots, the slots may furthermore be covered by a slot closure element. Said slot closure element is in particular in the form of a slit tube which is simple to produce and easy to position. Preferably, the slot closure element consists of an electrically insulating and/or nonmagnetic material. In this case, it influences neither the magnetic nor the electrical response of the synchronous machine in an undesirable manner. For example, the slot closure element consists of a plastic or a ceramic.

Another variant is distinguished by the fact that a magnet pole coverage of ⅘, i.e. of 80%, of a pole pitch of the permanent magnets is provided on the rotor. This measure suppresses interaction between the rotor and stator magnetic field waves resulting in torque ripple. In particular, the fifth harmonic to the useful pole pair number is thus suppressed, as a result of which at least a reduction in the undesirable torque ripple is achieved.

Likewise favorable in terms of the avoidance of torque ripple is an embodiment in which the stator has a cylindrical boundary area, which faces the rotor, has a circumference and is in particular the wall area of the stator bore in the case of an internal-rotor machine. The slots each have a slot opening width which is equal to the circumference divided by three times the useful pole pair number. This measure suppresses so-called cogging in the third harmonic to the useful pole pair number and in all integral multiples of the third harmonic.

The permanent-magnet synchronous machine may be designed to have both an internal rotor and an external rotor. The favorable configurations described above can be used in both embodiments.

Further features, advantages and details of the invention are given in the description below relating to one exemplary embodiment with reference to the drawing, in which:

DETAILED DESCRIPTION OF THE PREFERRED EMBODIMENTS

Figure 1:
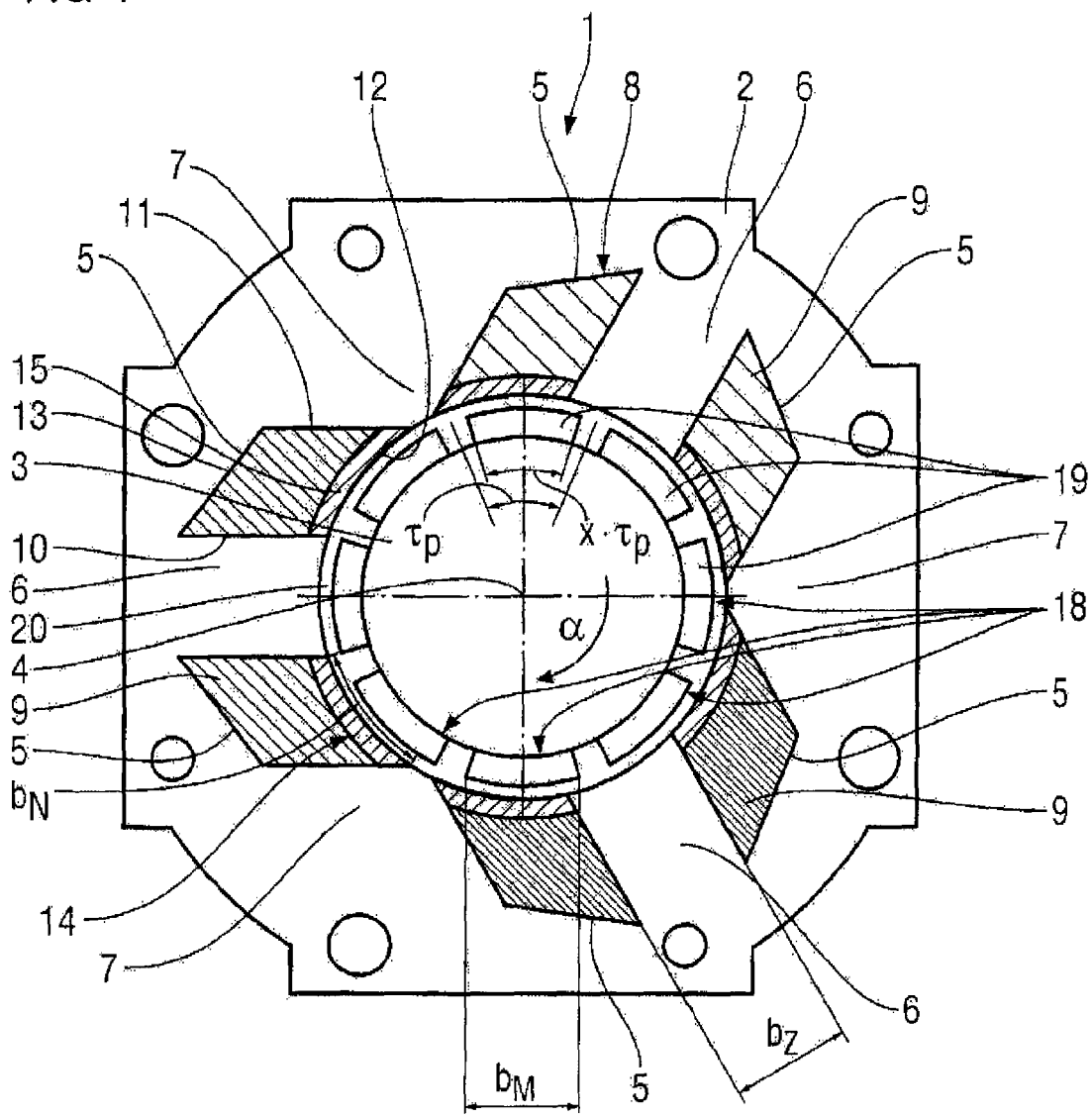
FIG. 1 shows an exemplary embodiment of a multipole permanent-magnet synchronous machine, in cross section.
Figure 2:
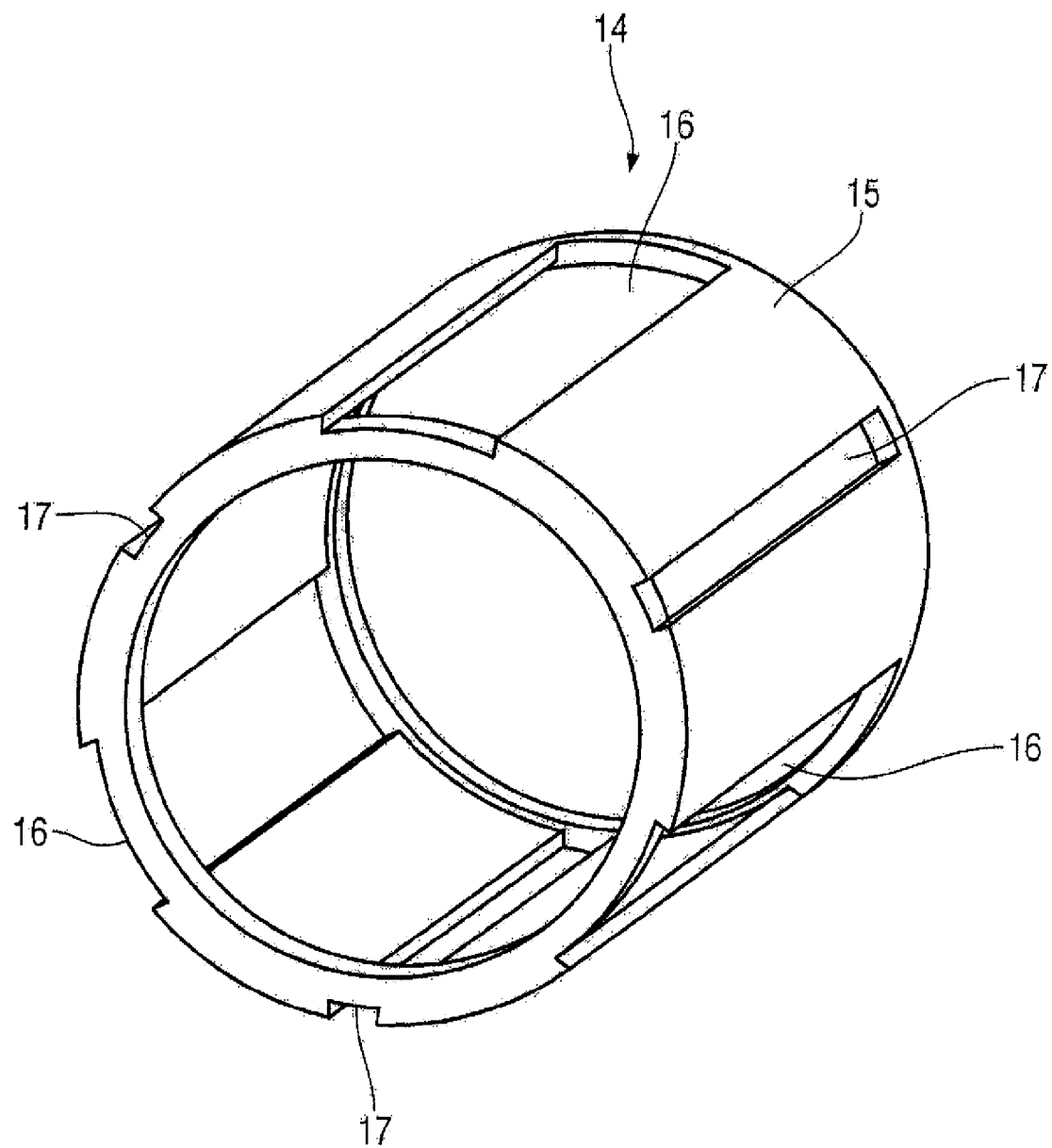
FIG. 2 shows a slot closure element of the permanent-magnet synchronous machine shown in FIG. 1.

Mutually corresponding parts have been provided with the same reference symbols in FIGS. 1 and 2.

FIG. 1 shows a cross-sectional illustration of a permanent-magnet synchronous machine 1 in the form of a motor. It contains a stator 2 having a cylindrical stator bore and a rotor 3, which is arranged in the stator bore and is mounted such that it can rotate about an axis of rotation 4. The rotor 3 is an internal rotor. The stator 2 has six slots 5 on its inner wall facing the rotor 3, between which slots in each case teeth 6 and 7 are formed. A yoke around the outside connects the teeth 6 and 7 to one another. A winding system 8 having three winding phases and having in total three tooth-wound coils 9 is arranged in the slots 5, each of which tooth-wound coils being shown by different hatching in FIG. 1.

Each of the tooth-wound coils 9 surrounds one of the teeth 6, with the result that a wound tooth 6 alternates with an unwound tooth 7 in the circumferential direction. Only turns of a single one of the tooth-wound coils 9 are arranged in each of the slots 5. These are therefore single-layer tooth-wound coils 9.

The slots 5 have a cross section which is virtually in the form of a parallelogram. Two slot side walls 10 and 11 which extend in the interior of the stator 2 are parallel to one another. A slot end side 12, which faces the rotor, is not flat, but is designed to be bent so as to correspond to the radius of curvature of the stator bore, with the result that only approximate parallelism is provided in relation to an opposite slot base 13. The slot end side 12 is completely open. Owing to this slot shape, the wound and the unwound teeth 6 and 7 have a different cross-sectional shape.

The special slot shape with the parallel slot side walls 10 and 11 and the open slot end side 12 makes it possible for the tooth-wound coils 9 to be configured as prefabricated former-wound coils, which can be inserted into the stator 2 easily.

In order to secure the tooth-wound coils 9 inserted in such a way in position, a closure element 14 in the form of a slit plastic tube 12 is provided, which is shown in the perspective illustration in FIG. 2. At points at which it is pushed over the teeth 6 and 7, it contains slits 16 and 17, respectively, whose widths differ from one another so as to correspond to the widths of the teeth 6 and 7, respectively, at the bore wall.

The rotor 3 is provided with eight permanent magnets 18. This results in a useful pole pair number $p_N$ of four for the permanent-magnet synchronous machine 1. The permanent-magnet synchronous machine 1 is therefore a multipole harmonic machine. A magnet width $b_M$ of the permanent magnets 18 is approximately equal to a tooth width $b_Z$ of the wound teeth 6.

The slots 5 each have a slot opening width $b_N$ which is equal to the circumference of the cylindrical stator bore divided by three times the useful pole pair number $p_N$. In the exemplary embodiment, a slot opening width $b_N$ of 9.687 mm is therefore provided at a bore diameter D of 37 mm.

The permanent magnets 18 are therefore arranged on the rotor 3 in such a way that in total eight magnet poles 19 are provided which are distributed uniformly over the circumference. A magnet pole 19 is assigned a pole pitch $\tau_P$ which is formed by an angular range of a circumferential angle α. The permanent magnets 18 do not extend over the entire angular range of the pole pitch $\tau_P$ in the circumferential direction but only over part X·$\tau_P$.

The variable x in this case denotes a pole coverage. it has a value of less than one. In the exemplary embodiment, the pole coverage x is ⅘, i.e. 80%.

In the text which follows, the functioning and advantages of the permanent-magnet synchronous machine 1 will be described in more detail.

Owing to the combination of the low slot number (or coil number) with the high useful pole pair number $p_N$, which has not been known to date, it has a particularly high capacity.

A low slot number is, as is the use of the tooth-wound coils 9, favorable for a small physical size and cost-effective production. Furthermore, it has been found that the two pole pair numbers p of four and five are favored.

At lower pole pair numbers p of one or two, a relatively large yoke height is required in the stator 2, with the result that the slot cross-sectional area is small based on the total cross-sectional area of the stator 2. As a result, there is only a comparatively low copper fill factor. In addition, the then relatively large winding heads result in only a low winding factor. The latter and the small slot cross-sectional area result in an increase in the nonreactive resistance of the winding system 8. In contrast, with a pole pair number p of four or five, the nonreactive resistance is considerably smaller.

At higher pole pair numbers p of seven or more, electrical loading IB which can be achieved in the stator 2 given a sensible slot opening width $b_N$ decreases. Likewise, the magnet width $b_M$ of the permanent magnets 18 is reduced. Furthermore, higher frequencies occur, as a result of which the iron losses in the stator 2 increase. This all leads to a reduction in the capacity in comparison with the known optimum according to the invention with pole pair numbers p of four or five.

In the exemplary embodiment, the value four is therefore provided for the useful pole pair number $p_N$. By varying the slot opening width $b_N$ and the (average) coil width of the tooth-wound coils 9, a stator magnetic field having a dominant component can be set at the pole pair number p=4.

Figure 3:
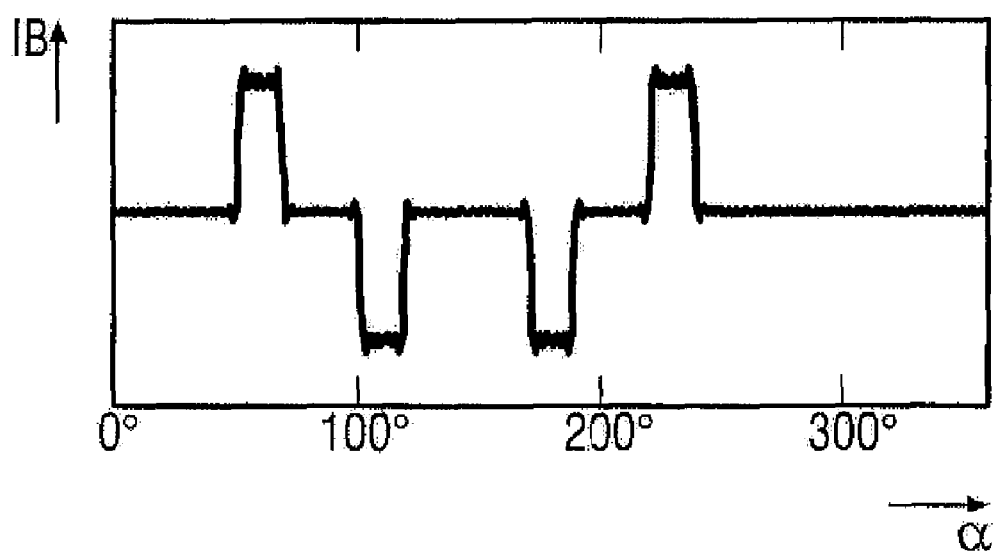
FIG. 3 shows a graph of the electrical loading plotted against the circumferential angle and a graph of the electrical loading plotted against the pole pair number, in each case in the stator of a permanent-magnet synchronous machine.
Figure 3:
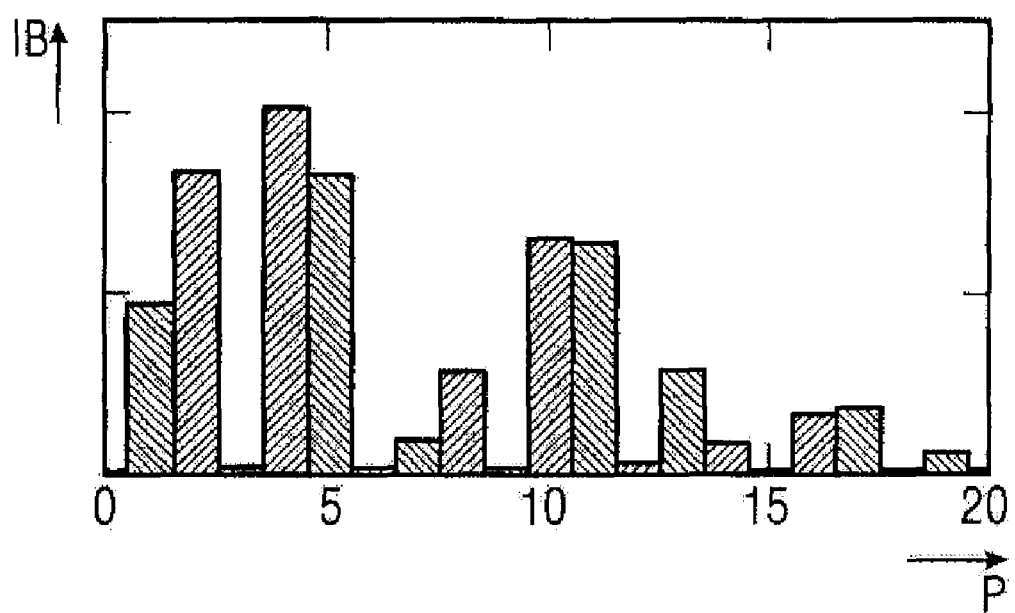

For a stator 2 having such a design, profiles of the electrical loading IB which is pronounced in two of the tooth-wound coils 9 of the winding system 8 are illustrated in the graph in FIG. 3. A slot opening width $b_N$ of 18° and a coil width of 50° are provided. In the graph at the top, the electrical loading IB is plotted against the circumferential angle α, and in the graph at the bottom it is plotted against the pole pair number p, the profile of the bottom graph being determined from that of the top graph by means of a Fourier transformation. It can be seen from the bottom graph that the pole pair number p=4 provided as the useful pole pair number $p_N$ is dominant.

During operation, the permanent-magnet synchronous machine 1 may have an undesirable torque ripple, for which there are various possible causes.

Firstly, reluctance forces between the permanent magnets 18 and the teeth 6 and 7 result in cyclic fluctuations in the magnetic conductance value and result in cogging. As a consequence, the torque contains a component with an oscillating torque.

By means of the especially selected dimensioning of the slot opening width $b_N$ in the exemplary embodiment, the cogging in the third harmonic to the useful pole pair number $p_N$, i.e. given the pole pair number p=12, and in all integral multiples of the pole pair number p=12 is suppressed. In this case, the generally valid relationship:

$$b_N = \frac{D \cdot \Pi}{p_0} \quad (1)$$

is used as a basis, where D denotes the diameter of the inner cylindrical boundary area of the stator 2, and $p_0$ denotes the pole pair number at which cogging should first be suppressed. When applying equation (1), the slot opening width $b_N$ is given as the arc length. Similarly, an equation is possible in which, instead of the circumference D·π, the circumferential angle of 360° corresponding to a complete revolution is given. The thus resulting slot opening width $b_N$ is given as the circumferential angle segment in angular degrees.

In addition to the cogging, interactions between the rotor and stator magnetic field waves in an air gap 20 which is provided between the stator 2 and the rotor 3 also cause the torque ripple. Particularly disruptive are the fifth and the seventh harmonic to the useful wave of the magnetic air-gap field forming in the air gap 20.

The fifth harmonics of the stator field and the rotor field rotate in the air gap 20 in opposite directions and therefore produce cogging at six times a useful pole pair number $p_N$. In order to suppress this component, it is sufficient if the fifth harmonic either of the stator field or of the rotor field is kept low. A suitable suppression measure for the stator field is a winding system 8 which has a low winding factor in the fifth harmonic or, for the rotor field, is a pole coverage which leads to a low fifth harmonic of the rotor field. In the exemplary embodiment, the second variant is selected. The pole coverage x is selected with the value ⅘ precisely such that the fifth harmonic of the rotor field is effectively reduced.

In addition to the high capacity, the cost-effective production and the low torque ripple, the permanent-magnet synchronous machine 1 has further advantages, for example, it can be realized with very small external dimensions, such as with an external diameter of 40 or 72 mm, for example. Nevertheless, operation at very high electrical voltages of 600 V or more is possible. Owing to the physical separation of the tooth-wound coils 9 by in each case one unwound tooth 7, a high inherent electrical insulation is provided. The simple design of the stator 2 is very well suited to segmentation and for largely automated manufacture.

Thus, a broad use spectrum is provided which includes the sector of servomotors but primarily also simple motor applications.

What is claimed is:

1. A permanent-magnet synchronous machine, comprising:
   a rotor; and
   a stator having no more than six slots, with each of neighboring ones of the slots defining a tooth, and
   a winding system having no more than three tooth-wound coils, each of the tooth-wound coils associated with a different winding phase and encompassing a single tooth, with a tooth having a tooth-wound coil alternating with a tooth without a tooth-wound coil in a circumferential direction of the stator;
   a slot closure element constructed in the form of a slit tube having, said slit tube having circumferentially contiguous annular end sections connected by axially extending lands configured for axial insertion into the slots, wherein the lands of the slot closure element have a wall thickness dimensioned so as not to protrude into an air gap formed between the stator teeth and the rotor, and wherein an annular end section has recesses formed externally along an external periphery of the end section commensurate with peripheral arrangement of the stator teeth and a radial depth dimensioned for passage of the end section over the stator teeth,
   wherein
   a useful rotor pole pair number is four or five, and
   the rotor comprises permanent magnets distributed uniformly over a circumference of the rotor, with a number of the permanent magnets being equal to twice the useful pole pair number.

2. The permanent-magnet synchronous machine of claim 1, wherein the wound teeth has a tooth width which is dimensioned in accordance with $$0.75 \cdot b_M < b_Z < 1.25 \cdot b_M,$$

wherein
$b_Z$ denotes the tooth width of the wound teeth, and
$b_M$ denotes a magnet width of the permanent magnets.

3. The permanent-magnet synchronous machine of claim 1, wherein the tooth-wound coils are in the form of prefabricated form-wound coils.

4. The permanent-magnet synchronous machine of claim 1, wherein each of the tooth-wound coils includes a winding comprised of a plurality of turns, wherein the respective windings are designed such that adjacent turns are at slightly differing electrical potentials from one another during operation.

5. The permanent-magnet synchronous machine of claim 1, wherein each of the slots has a side which faces the rotor and is open.

6. The permanent-magnet synchronous machine of claim 1, wherein each of the slots has two side walls, which extend away from the rotor and are arranged parallel to one another.

7. The permanent-magnet synchronous machine of claim 1, wherein the slot closure element is made of electrically insulating material.

8. The permanent-magnet synchronous machine of claim 1, wherein the slot closure element is made of nonmagnetic material.

9. The permanent-magnet synchronous machine of claim 1, wherein the permanent magnets are provided on the rotor at a pole coverage of 80% of a pole pitch.

10. The permanent-magnet synchronous machine of claim 1, wherein the stator has a cylindrical boundary area which faces the rotor and has a circumference, wherein each of the slots has a slot opening width which is equal to the circumference divided by three times the useful pole pair number.

* * * * *

UNITED STATES PATENT AND TRADEMARK OFFICE
CERTIFICATE OF CORRECTION

| | |
|---|---|
| PATENT NO. | : 7,977,826 B2 |
| APPLICATION NO. | : 11/720645 |
| DATED | : July 12, 2011 |
| INVENTOR(S) | : Rolf Vollmer et al. |

Page 1 of 1

It is certified that error appears in the above-identified patent and that said Letters Patent is hereby corrected as shown below:

Column 6, line 28, claim 1: delete "having" before --, said--.

Signed and Sealed this
Fifteenth Day of November, 2011

David J. Kappos
*Director of the United States Patent and Trademark Office*